US012603272B2

(12) United States Patent
Takahashi et al.

(10) Patent No.: US 12,603,272 B2
(45) Date of Patent: Apr. 14, 2026

(54) ALKALINE DRY BATTERY

(71) Applicant: Panasonic Intellectual Property Management Co., Ltd., Osaka (JP)

(72) Inventors: Yasufumi Takahashi, Hyogo Ken (JP); Takayuki Nakatsutsumi, Osaka Fu (JP); Yasuyuki Kusumoto, Hyogo Ken (JP); Atsushi Fukui, Hyogo Ken (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 779 days.

(21) Appl. No.: 17/796,205

(22) PCT Filed: Oct. 20, 2020

(86) PCT No.: PCT/JP2020/039334
§ 371 (c)(1),
(2) Date: Jul. 28, 2022

(87) PCT Pub. No.: WO2021/152932
PCT Pub. Date: Aug. 5, 2021

(65) Prior Publication Data

US 2023/0092792 A1 Mar. 23, 2023

(30) Foreign Application Priority Data

Jan. 29, 2020 (JP) ................................ 2020-012893

(51) Int. Cl.
*H01M 4/24* (2006.01)
*H01M 4/62* (2006.01)
*H01M 4/02* (2006.01)
*H01M 10/24* (2006.01)

(52) U.S. Cl.
CPC ............. *H01M 4/244* (2013.01); *H01M 4/62* (2013.01); *H01M 2004/021* (2013.01); *H01M 2004/027* (2013.01); *H01M 10/24* (2013.01)

(58) Field of Classification Search
CPC ........... H01M 4/244; H01M 2004/027; H01M 2004/021; H01M 4/483; H01M 4/62; H01M 4/48; H01M 10/24
See application file for complete search history.

(56) References Cited

U.S. PATENT DOCUMENTS

| | | | |
|---|---|---|---|
| 5,919,588 | A | 7/1999 | Jose et al. |
| 2009/0053595 | A1 | 2/2009 | Izumi et al. |
| 2010/0196763 | A1 | 8/2010 | Morimitsu et al. |
| 2018/0190997 | A1 | 7/2018 | Takahashi |
| 2019/0157662 | A1 | 5/2019 | Takahashi et al. |
| 2021/0005886 | A1 | 1/2021 | Kusumoto et al. |
| 2022/0231275 | A1 | 7/2022 | Kusumoto et al. |

FOREIGN PATENT DOCUMENTS

| | | | |
|---|---|---|---|
| CN | 1169597 | A | 1/1998 |
| CN | 101714632 | A | 5/2010 |
| CN | 101755352 | A | 6/2010 |
| CN | 107851809 | A | 3/2018 |
| CN | 109309218 | A | 2/2019 |
| JP | 2609609 | B2 | 5/1997 |
| JP | 2008-010250 | A | 1/2008 |
| JP | 2008-034375 | A | 2/2008 |
| WO | 2018/066204 | A1 | 4/2018 |
| WO | 2019/181029 | A1 | 9/2019 |

OTHER PUBLICATIONS

International Search Report dated Jan. 12, 2021, issued in counterpart International application No. PCT/JP2020/039334, with English translation. (4 pages).
Written Opinion dated Jan. 12, 2021, issued in counterpart International application No. PCT/JP2020/039334. (3 pages).
Office Action dated Feb. 24, 2024, issued in counterpart CN Application No. 202080093698..X, with partial English translation. (11 pages).

*Primary Examiner* — Laura Weiner
(74) *Attorney, Agent, or Firm* — WHDA, LLP

(57) ABSTRACT

An alkaline dry battery includes a positive electrode, a negative electrode, a separator disposed between the positive electrode and the negative electrode, and an electrolyte, and the negative electrode includes a negative electrode active material containing zinc, a compound A having a P—O bond, and terephthalic acid. The molar ratio of the compound A to the terephthalic acid is 0.025 or more and 2.5 or less.

8 Claims, 1 Drawing Sheet

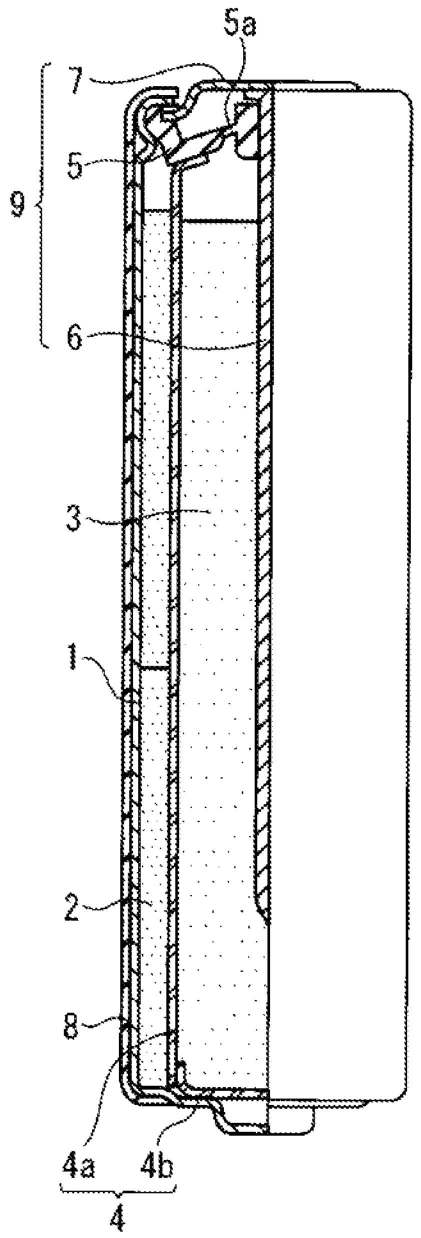
5a
7
5
9
6
3
1
2
8
4a
4b
4

ALKALINE DRY BATTERY

TECHNICAL FIELD

The present disclosure relates to an improvement of the discharge performance in a low temperature environment of an alkaline dry battery.

BACKGROUND ART

Alkaline dry batteries (alkaline manganese dry batteries) have been widely used because of their large capacity as compared to those of manganese dry batteries and a large current that can be drawn therefrom. For the electrolyte of alkaline dry batteries, an aqueous solution of potassium hydroxide and the like is used, which has favorable viscosity and ion conductivity in a room temperature environment of around 20° C.

Patent Literature 1, with an aim to suppress internal short-circuiting caused by the crystal growth of a reaction product during discharge, proposes to contain phosphoric acid or phosphate ions in a gel negative electrode including an aluminum-containing zinc alloy as a negative electrode active material.

Patent Literature 2, with an aim to suppress internal short-circuiting caused by the scattering of a gel negative electrode to the positive electrode upon strong impact on the battery, proposes to contain terephthalic acid having a specific particle diameter in the gel negative electrode.

CITATION LIST

Patent Literatures

[PTL 1] Japanese Patent No. 2609609
[PTL 2] International Publication WO2018/066204

SUMMARY OF INVENTION

Technical Problem

When the battery is discharged in a low temperature environment of, for example, 0° C., the electrolyte (water) becomes difficult to move (diffuse) from the negative electrode to the positive electrode, and the balance of electrolyte (water) between the positive and negative electrodes becomes unfavorable, which may cause the discharge performance to deteriorate in some cases. During discharge, water is produced at the negative electrode, and the water is consumed at the positive electrode. The movement (diffusion) of the electrolyte (water) from the negative electrode to the positive electrode during discharge has a great influence on the discharge performance.

One aspect of the present disclosure relates to an alkaline dry battery, including: a positive electrode; a negative electrode; a separator disposed between the positive electrode and the negative electrode; and an electrolyte, wherein the negative electrode includes a negative electrode active material containing zinc, a compound A having a P—O bond, and terephthalic acid, and a molar ratio of the compound A to the terephthalic acid is 0.025 or more and 2.5 or less.

According to the present disclosure, an alkaline dry battery having excellent discharge performance in a low temperature environment can be provided.

BRIEF DESCRIPTION OF DRAWING

FIG. 1 A front view, partially in section, of an alkaline dry battery according to one embodiment of the present disclosure.

DESCRIPTION OF EMBODIMENTS

An alkaline dry battery according to an embodiment of the present disclosure includes a positive electrode, a negative electrode, a separator disposed between the positive electrode and the negative electrode, and an electrolyte. The negative electrode includes a negative electrode active material containing zinc, a compound A having a P—O bond (hereinafter sometimes simply referred to as a compound A), and terephthalic acid, and a molar ratio of the compound A to the terephthalic acid is 0.025 or more and 2.5 or less.

The inclusion of the compound A and terephthalic acid in a specific molar ratio in the negative electrode can specifically improve the discharge performance in a low temperature environment. Although the details are unclear, when the compound A, which easily mixes with terephthalic acid uniformly, is mixed with the terephthalic acid in a specific molar ratio in the negative electrode, the electrolyte (water) balance between the positive and negative electrodes in a low temperature environment is improved. The molar ratio of the compound A to the terephthalic acid is preferably 0.25 or more and 2.3 or less, more preferably 0.25 or more and 1.5 or less.

The molar ratio of the compound A to the terephthalic acid can be determined, for example, by the following method.

The battery is disassembled to take out the negative electrode, and the components in the negative electrode are extracted with pure water and allowed to stand to obtain a supernatant liquid. The alkaline component in the liquid is removed by cation exchange chromatography. Then, the amount of terephthalic acid ion in the supernatant liquid is determined using ion chromatography (IC). Also, the amount of phosphorus in the supernatant liquid is determined using high-frequency inductively coupled plasma (ICP) emission spectroscopy. The structure (molecular weight) of the compound A is determined using liquid chromatography-mass spectrometry (LC/MS) and nuclear magnetic resonance (NMR) spectrometry in combination, to confirm that the phosphorus has been derived from the compound A. Based on the above analysis results, the (compound A/terephthalic acid) ratio by mol is determined from the terephthalic acid ion amount and the phosphorus amount.

In the negative electrode, the molar ratio: P/Zn of P element derived from the compound A to Zn element derived from the negative electrode active material is preferably 0.00001 or more and 0.0014 or less, more preferably 0.0001 or more and 0.0008 or less. When the P/Zn is 0.00001 or more, the liquid balance between the positive and negative electrodes during discharge at low temperatures tends to be improved. When the P/Zn is 0.0014 or less, favorable viscosity and ion conductivity tend to be obtained in the electrolyte in the negative electrode. The Zn amount and the P amount in the negative electrode can be determined by, for example, ICP emission spectroscopy.

As the compound A, phosphoric acid is exemplified. The compound A may be a salt, such as an alkali metal salt, and may be, for example, a phosphate salt. Examples of the phosphate salt include potassium phosphate ($K_3PO_4$), sodium phosphate ($Na_3PO_4$), potassium hydrogen phosphate ($K_2HPO_4$), and sodium hydrogen phosphate ($Na_2HPO_4$). In particular, potassium phosphate is preferred. The compound A may be used singly or in combination of two or more kinds.

The compound A may be an ester compound A having a P—O bond (hereinafter sometimes simply referred to as an ester compound A). The ester compound A has a P—O bond-containing group as a hydrophilic group and a hydrocarbon group as a hydrophobic group, and can act as an anionic surfactant. The P—O bond-containing group is easily adsorbed onto the negative electrode active material. In view of the hydrophilicity, the P—O bond-containing group may have one or two OM groups (M is a hydrogen atom or an alkali metal atom). The ester compound A may have a hydrophilic group, such as a polyoxyethylene group and a polyoxypropylene group.

Preferred as the ester compound A are a phosphite ester and a phosphate ester, and more preferred is a phosphate ester. In this case, the electrolyte (water) balance between the positive and negative electrodes during discharge at low temperatures tends to be remarkably improved. Specific examples of the ester compound A include a polyoxyalkylene alkyl ether phosphate ester and an alkyl phosphate ester. The ester compound A may be a monoester, a diester, or a triester.

In view of improving the discharge performance in a low temperature environment, the ester compound A is preferably a monoester compound represented by a following general formula (1). By allowing the compound represented by the general formula (1) to be present together with terephthalic acid in a specific molar ratio, the liquid balance between the positive and negative electrodes during discharge at low temperatures tends to be improved.

[Chem. 1]

(1)

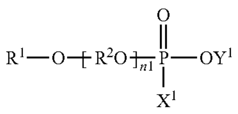

In the general formula (1), $R^1$ is a hydrocarbon group having 1 to 20 carbon atoms. $R^1$ has hydrophobicity and affects the improvement in the electrolyte (water) balance between the positive and negative electrodes during discharge at low temperatures. $R^2$ is an ethylene group: $—CH_2CH_2—$ or a propylene group: $—CH_2(CH_3)CH_2—$. The symbol n1 represents an average number of moles of added $R^2O$ (average number of repeating $R^2O$ units), and is 0 or more and 8 or less. When n1=0, $R^1$ is directly bonded to the phosphorus atom via the oxygen atom, without $(R^2O)_{n1}$ therebetween. $X^1$ is a hydrogen atom or an $OM^1$ group, and $M^1$ is a hydrogen atom or an alkali metal atom. $Y^1$ is a hydrogen atom or an alkali metal atom. The alkali metal atom includes a potassium atom and a sodium atom.

In view of further improving the discharge performance in a low temperature environment, $R^1$ is preferably a hydrocarbon group having 2 to 16 carbon atoms, more preferably a hydrocarbon group having 2 to 10 carbon atoms; and n1 may be 1 or more and 4 or less, preferably 2 or more and 4 or less. In this case, the diffusibility of the electrolyte from the negative electrode to the positive electrode is likely to be improved, and the liquid balance between the positive and negative electrodes during discharge at low temperatures tends to be improved.

In view of improving the discharge performance in a low temperature environment, the ester compound A is preferably a diester compound represented by a following general formula (2). By allowing the compound represented by the general formula (2) to be present together with terephthalic acid in a specific molar ratio, the liquid balance between the positive and negative electrodes during discharge at low temperatures tends to be improved.

[Chem. 2]

(2)

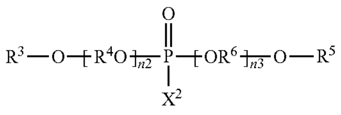

In the general formula (2), $R^3$ and $R^5$ are each independently a hydrocarbon group having 1 to 20 carbon atoms. $R^3$ and $R^5$ have hydrophobicity and affect the improvement in the electrolyte (water) balance between the positive and negative electrodes during discharge at low temperatures. $R^4$ and $R^6$ are each independently an ethylene group: $—CH_2CH_2—$ or a propylene group: $—CH_2(CH_3)CH_2—$. The symbol n2 represents an average number of moles of added $R^4O$ (average number of repeating $R^4O$ units), and is 0 or more and 8 or less. When n2=0, $R^3$ is directly bonded to the phosphorus atom via the oxygen atom, without $(R^4O)_{n2}$ therebetween. The symbol n3 represents an average number of moles of added $OR^6$ (average number of repeating $OR^6$ units), and is 0 or more and 8 or less. When n3=0, $R^5$ is directly bonded to the phosphorus atom via the oxygen atom, without $(OR^6)_{n3}$ therebetween. $X^2$ is a hydrogen atom or an $OM^2$ group, and $M^2$ is a hydrogen atom or an alkali metal atom (e.g., potassium atom, sodium atom).

In view of further improving the discharge performance in a low temperature environment, the $R^3$ and $R^5$ are preferably each independently a hydrocarbon group having 2 to 16 carbon atoms, more preferably a hydrocarbon group having 2 to 10 carbon atoms; and n2 and n3 may be each independently 1 or more and 4 or less. The total of n2 and n3 is preferably 2 or more and 4 or less. In this case, the diffusibility of the electrolyte from the negative electrode to the positive electrode is likely to be improved, and the liquid balance between the positive and negative electrodes during discharge at low temperatures tends to be improved.

The hydrocarbon groups represented by $R^1$ in the formula (1) and $R^3$ and $R^5$ in the formula (2) may have a straight or branched chain structure. The hydrocarbon group includes, for example, an alkyl group and an alkenyl group. Particularly preferred is an alkyl group having 1 to 20 carbon atoms. The alkyl group includes, for example, a methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nanodecyl group, and eicosyl group. The alkenyl group includes, for example, a vinyl group, 1-propenyl group, allyl group, isopropenyl group, 2-butenyl group, 3-butenyl group, 2-pentenyl group, and 3-pentenyl group.

The content of the terephthalic acid in the negative electrode may be, for example, 0.01 parts by mass or more and 0.5 parts by mass or less, per 100 parts by mass of the negative electrode active material. When the content of the terephthalic acid in the negative electrode is 0.01 parts by mass or more per 100 parts by mass of the negative electrode active material, the liquid balance between the positive and negative electrodes during discharge at low temperatures tends to be improved. When the content of the terephthalic acid in the negative electrode is 0.5 parts by mass or less per 100 parts by mass of the negative electrode active material, favorable viscosity and ion conductivity can be easily obtained in the electrolyte in the negative electrode.

Terephthalic acid hardly dissolves in the electrolyte in the negative electrode in some cases, and can be present in the form of particles. The particle diameter (D50) of the terephthalic acid contained in the negative electrode may be, for example, 25 μm or more and 210 μm or less, and may be 100 μm or more and 210 μm or less. In this case, the dispersiveness in the negative electrode is enhanced, and the negative electrode tends to be homogenized.

In the present specification, the particle diameter (D50) refers to a median diameter in a volumetric particle size distribution. The particle diameter (D50) can be measured by, for example, using a laser diffraction scattering type particle size distribution analyzer.

The alkaline dry battery according to an embodiment of the present disclosure includes, for example, a cylindrical battery and a coin battery.

A detailed description will be given below of an alkaline dry battery according to the present embodiment, with reference to the drawing. The present disclosure, however, is not limited to the following embodiment. Modification can be made as appropriate without departure from the scope in which the effect of the present disclosure can be exerted. Furthermore, any combination with another embodiment is possible.

FIG. 1 is a front view of an alkaline dry battery according to one embodiment of the present disclosure, with one half side shown in cross-section. FIG. 1 illustrates an example of an inside-out type cylindrical battery. As illustrated in FIG. 1, the alkaline dry battery includes a hollow cylindrical positive electrode 2, a gel negative electrode 3 disposed in the hollow of the positive electrode 2, a separator 4 interposed therebetween, and an electrolyte, which are all housed in a bottomed cylindrical battery case 1 serving as a positive electrode terminal. The electrolyte used here is an aqueous alkaline solution.

The positive electrode 2 is disposed in contact with the inner wall of the battery case 1. The positive electrode 2 includes a manganese dioxide and an electrolyte. In the hollow of the positive electrode 2, the gel negative electrode 3 is packed, with the separator 4 interposed therebetween. The negative electrode 3 includes a negative electrode active material containing zinc, the compound A and terephthalic acid, and usually, in addition, an electrolyte and a gelling agent.

The separator 4 has a bottomed cylindrical shape and retains an electrolyte. The separator 4 is constituted of a cylindrically-shaped separator 4*a* and a bottom paper 4*b*. The separator 4*a* is disposed along the inner surface of the hollow of the positive electrode 2, to provide insulation between the positive electrode 2 and the negative electrode 3. The separator disposed between the positive electrode and the negative electrode means the cylindrically-shaped separator 4*a*. The bottom paper 4*b* is disposed at the bottom of the hollow of the positive electrode 2, to provide insulation between the negative electrode 3 and the battery case 1.

The opening of the battery case 1 is sealed with a sealing unit 9. The sealing unit 9 includes a gasket 5, a negative electrode terminal plate 7 serving as a negative electrode terminal, and a negative electrode current collector 6. The gasket 5 has an annular thin-walled portion 5*a*. When the battery internal pressure increases beyond a specified value, the thin-walled portion 5*a* breaks, to release the gas outside the battery. The negative electrode current collector 6 is inserted into the negative electrode 3. The negative electrode current collector 6 has a nail-like shape having a head and a shank, and the shank is passed through a through-hole provided in the center cylindrical portion of the gasket 5. The head of the negative electrode current collector 6 is welded to the flat portion at the center of the negative electrode terminal plate 7. The opening end of the battery case 1 is crimped onto the flange around the periphery of the negative electrode terminal plate 7, via the peripheral end portion of the gasket 5. The outer surface of the battery case 1 is covered with an outer label 8.

In the inside-out type structure, in a low temperature environment, the viscosity of the electrolyte increases, and the electrolyte (water) becomes difficult to move to the outer peripheral portion of the positive electrode (toward the battery case). The liquid balance between the positive and negative electrodes becomes unfavorable, making it difficult to effectively utilize the outer peripheral portion of the positive electrode. Thus, the discharge performance tends to deteriorate. To address this, the compound A and terephthalic acid are included at a specific molar ratio in the negative electrode. This can improve the liquid balance between the positive and negative electrodes, and thus can remarkably improve the discharge performance in a low temperature environment.

A detailed description will be given below of the alkaline dry battery.

(Negative Electrode)

The negative electrode active material may be, for example, zinc or a zinc alloy. The zinc alloy may contain at least one selected from the group consisting of indium, bismuth, and aluminum, in view of the corrosion resistance. The indium content in the zinc alloy is, for example, 0.01 to 0.1 mass %, and the bismuth content is, for example, 0.003 to 0.02 mass %. The aluminum content in the zinc alloy is, for example, 0.001 to 0.03 mass %. In view of the corrosion resistance, the proportion of the element(s) other than zinc occupying the zinc alloy is preferably 0.025 to 0.08 mass %.

The negative electrode active material is usually used in the form of particles. In view of the packability of the negative electrode and the diffusibility of the electrolyte in the negative electrode, the diameter (D50) of the negative electrode material particles may be, for example, 100 μm or more and 200 μm or less, and may be 110 μm or more and 160 μm or less.

The diameter (D50) of the negative electrode material particles may be 120 μm or less, may be 75 μm or less, and may be 40 μm or more and 75 μm or less. When the diameter (D50) of the negative electrode material particles is 120 μm or less, the reaction efficiency at the negative electrode can be further enhanced, and the discharge performance in a low temperature environment can be further improved. Preferably, the diameter (D50) of the negative electrode active material particles is 75 μm or less.

In view of improving the reaction efficiency at the negative electrode, the particles of the negative electrode active material contained in the negative electrode may include particles having a diameter of 75 μm or less in a proportion of 60 vol % or more.

The negative electrode can be obtained by, for example, mixing a negative electrode active material, the compound A, terephthalic acid, a gelling agent, and an electrolyte. The compound A is added in an amount of, for example, 0.005 parts by mass or more and 0.45 parts by mass or less, per 100 parts by mass of the negative electrode active material. The gelling agent may be any known gelling agent used in the field of alkaline dry batteries, and is, for example, a water-absorbent polymer. Examples of the gelling agent include polyacrylic acid and sodium polyacrylate. The gelling agent is added in an amount of, for example, 0.5 parts by mass or more and 2.5 parts by mass or less, per 100 parts by mass of the negative electrode active material.

In producing a negative electrode, when the ester compound A has a hydrocarbon group with a large number of carbon atoms, it can happen that the ester compound A hardly dissolves in the electrolyte. In this case, by containing terephthalic acid together with the ester compound A in the electrolyte in advance in producing a negative electrode, the ester compound A can be easily dispersed uniformly in the electrolyte. This can minimize the necessity of stirring the electrolyte, and can suppress the occurrence of bubbling associated with stirring of the electrolyte. When terephthalic acid is not contained in the electrolyte in advance in producing a negative electrode, it is necessary to stir the electrolyte sufficiently in order to uniformly disperse the ester compound A in the electrolyte, which may cause bubbling in the electrolyte.

A compound containing a metal with high hydrogen overvoltage, such as indium and bismuth, may be added as appropriate in the negative electrode, for improving the corrosion resistance. Also, a very small amount of silicic acid or a silicic acid compound, such as a potassium salt of silicic acid, may be added as appropriate in the negative electrode, in order to suppress the growth of dendrites of zinc and others.

(Negative Electrode Current Collector)

Examples of the material of the negative electrode current collector inserted into the gel negative electrode include a metal and an alloy. The negative electrode current collector preferably contains copper, and may be made of, for example, an alloy containing copper and zinc, such as brass. The negative electrode current collector may be plated with tin or the like, if necessary.

(Positive Electrode)

The positive electrode usually includes a manganese dioxide serving as a positive electrode active material, and in addition, an electrically conductive agent and an electrolyte. The positive electrode may further includes a binder, as needed.

The manganese dioxide is preferably an electrolytic manganese dioxide. Examples of the crystal structure of the manganese dioxide include α-type, β-type, γ-type, δ-type, ε-type, η-type, λ-type, and ramsdellite-type crystal structures.

The manganese dioxide is usually used in the form of powder. In view of the packability of the positive electrode and the diffusibility of the electrolyte in the positive electrode, the particle diameter (D50) of the manganese dioxide is, for example, 25 μm or more and 60 μm or less.

In view of the moldability and the suppression of the positive electrode expansion, the BET specific surface area of the manganese dioxide may be 20 $m^2/g$ or more and 50 $m^2/g$ or less. The BET specific surface area is obtained by measuring and calculating a surface area using a BET equation, which is a theoretical equation of multilayer adsorption. The BET specific surface area can be measured using, for example, a specific surface area meter by a nitrogen adsorption method.

Examples of the conductive agent include carbon black, such as acetylene black, and an electrically conductive carbon material, such as graphite. The graphite may be natural graphite, artificial graphite, and the like. The conductive agent may be in the form of fibers or the like, but is preferably in the form of powder. The particle diameter (D50) of the conductive agent is, for example, 3 μm or more and 20 μm or less.

The content of the conductive agent in the positive electrode is, for example, 3 parts by mass or more and 10 parts by mass or less, preferably 5 parts by mass or more and 9 parts by mass or less, relative to 100 parts by mass of the manganese dioxide.

The positive electrode can be formed by, for example, compression-molding a positive electrode material mixture including a positive electrode active material, an electrically conductive agent, an electrolyte, and if necessary, a binder, into a pellet shape. The positive electrode material mixture may be formed into flakes or granules and classified if necessary, and then compression-molded into a pellet shape.

Pellets thus formed are inserted into a battery case, which may be followed by secondary compression to bring them into close contact with the inner wall of the battery case, using a predetermined tool.

(Separator)

Examples of the material of the separator include cellulose and polyvinyl alcohol. The separator may be, for example, a nonwoven fabric mainly composed of fibers of the above material, or a cellophane- or polyolefin-based microporous film. A nonwoven fabric and a microporous film may be used in combination. Examples of the nonwoven fabric include a mixed nonwoven fabric mainly composed of cellulose fibers and polyvinyl alcohol fibers, and a mixed nonwoven fabric mainly composed of rayon fibers and polyvinyl alcohol fibers.

In FIG. 1, the cylindrically-shaped separator 4*a* and the bottom paper 4*b* are used to constitute the bottomed cylindrical separator 4. The bottomed cylindrical separator is not limited thereto, and may be a known-shaped separator used in the field of alkaline dry batteries. The separator may be constituted of one sheet of separator, or when the separator is thin, may be constituted by laminating a plurality of the separators together. A cylindrically-shaped separator may be constituted by winding a thin sheet of separator into a plurality of layers.

The thickness of the separator is, for example, 200 μm or more and 300 μm or less. The separator preferably has the above thickness as a whole. When the separator is thin, a plurality of the separators may be laminated to have a thickness in the range above.

(Electrolyte)

The electrolyte is retained in the positive electrode, the negative electrode, and the separator. The electrolyte is, for example, an aqueous alkaline solution containing a potassium hydroxide. The potassium hydroxide concentration in the electrolyte is, for example, 30 mass % or more and 50 mass % or less. The electrolyte may further contain a zinc oxide. The zinc oxide concentration in the electrolyte is, for example, 1 mass % or more and 5 mass % or less.

(Battery Case)

The battery case may be, for example, a bottomed cylindrical metal case. The battery case is made of, for example, a nickel-plated steel sheet. In order to improve the adhesion between the positive electrode and the battery case, the battery case is preferably a metal case whose inner surface is covered with carbon coating.

EXAMPLES

The present disclosure will be more specifically described below with reference to Examples and Comparative Examples. It is to be noted, however, the present invention is not limited to the following Examples.

Example 1

An AA-size cylindrical alkaline dry battery (LR6) as illustrated in FIG. 1 was fabricated by the following procedures.

[Production of Positive Electrode]

Electrolytic manganese dioxide powder (diameter (D50): 35 μm) serving as a positive electrode active material was mixed with graphite powder (diameter (D50): 8 μm) serving as an electrically conductive agent, to give a mixture. The mass ratio of the electrolytic manganese dioxide powder to the graphite powder was set to 92.4:7.6. The electrolytic manganese dioxide powder used here had a specific surface area of 41 $m^2/g$. Next, 1.5 parts by mass of an electrolyte was added to 100 parts by mass of the mixture and stirred sufficiently, and then, compression-molded into a flake form, to prepare a positive electrode material mixture. The electrolyte used here was an aqueous alkaline solution containing potassium hydroxide (concentration: 35 mass %) and zinc oxide (concentration: 2 mass %).

The flake form of the positive electrode material mixture was crushed into a granular form, and classified through a 10- to 100-mesh sieve. Then, 11 g of the resultant granules were compression-molded into a predetermined hollow cylindrical shape of 13.65 mm in outer diameter, to form a positive electrode pellet. Two pellets were produced.

[Production of Negative Electrode]

A negative electrode active material, an electrolyte, a gelling agent, a compound A, and terephthalic acid (diameter (D50): 130 μm) were mixed to give a gel negative electrode 3. The negative electrode active material used here was a zinc alloy powder (diameter (D50): 130 μm) containing 0.02 mass % of indium, 0.01 mass % of bismuth, and 0.005 mass % of aluminum. The proportion of the particles of 75 μm or less occupying the zinc alloy power was 23 vol %. The electrolyte used here was the same as that used for the production of the positive electrode. The gelling agent used here was a mixture of a cross-linked branched polyacrylic acid and a highly cross-linked linear sodium polyacrylate. The compound A used here was potassium phosphate ($K_3PO_4$). The negative electrode active material, the electrolyte, and the gelling agent were mixed in a mass ratio of 100:50:1.

The molar ratio of the compound A to the terephthalic acid was set to 0.28. The content of the compound A in the negative electrode was set to 0.05 parts by mass per 100 parts by mass of the negative electrode active material. The molar ratio: P/Zn of the element P to the element Zn in the negative electrode was set to 0.00015. The content of the terephthalic acid in the negative electrode was set to 0.14 parts by mass per 100 parts by mass of the negative electrode active material.

[Fabrication of Alkaline Dry Battery]

Varniphite available from Nippon Graphite Industries, Ltd. was applied to the inner surface of a bottomed cylindrical battery case (outer diameter: 13.80 mm, wall thickness of cylindrical portion: 0.15 mm, height: 50.3 mm) made of a nickel-plated steel sheet, to form a carbon coating having a thickness of approximately 10 μm. A battery case 1 was thus obtained. Next, two positive electrode pellets were inserted one on the other into the battery case 1 and then compressed, to form a positive electrode 2 in close contact with the inner wall of the battery case 1 via an electrically conductive film 10. A bottomed cylindrical separator 4 was placed inside the positive electrode 2, and then, an electrolyte was injected thereto, to be impregnated into the separator 4. The electrolyte used here was the same as that used for producing the positive electrode. These were allowed to stand in this state for a predetermined period, to allow the electrolyte to permeate from the separator 4 into the positive electrode 2. Thereafter, 6 g of the gel negative electrode 3 was packed inside the separator 4.

The separator 4 was constituted of a cylindrically-shaped separator 4*a* and a bottom paper 4*b*. The cylindrically-shaped separator 4*a* and the bottom paper 4*b* were formed using a mixed nonwoven fabric (basis weight: 28 $g/m^2$) mainly composed of rayon fibers and polyvinyl alcohol fibers mixed in a mass ratio of 1:1. The thickness of the nonwoven fabric used for the bottom paper 4*b* was 0.27 mm. The separator 4*a* was constituted by winding a 0.09-mm-thick nonwoven fabric into three layers.

A negative electrode current collector 6 was prepared by press-working common brass (Cu content: approx. 65 mass %, Zn content: approx. 35 mass %) into a nail shape, and plating its surface with tin. The diameter of the shank of the negative electrode current collector 6 was set to 1.15 mm. The head of the negative electrode current collector 6 was welded to a negative electrode terminal plate 7 made of a nickel-plated steel sheet. Then, the shank of the negative electrode current collector 6 was press-inserted into the through-hole provided at the center of a gasket 5 mainly composed of polyamide 6,12. In this way, a sealing unit 9 composed of the gasket 5, the negative electrode terminal plate 7, and the negative electrode current collector 6 was formed.

Next, the sealing unit 9 was placed at the opening of the battery case 1. At this time, the shank of the negative electrode current collector 6 was inserted into the gel negative electrode 3. The opening end of the battery case 1 was crimped onto the periphery of the negative electrode terminal plate 7, with the gasket 5 interposed therebetween, to seal the opening of the battery case 1. The outside surface of the battery case 1 was covered with an outer label 8. In this way, an alkaline dry battery A1 was fabricated.

[Evaluation]

The battery A1 fabricated in the above was checked for its discharge performance in a low temperature environment by the following method.

The fabricated battery was discharged at 250 mA in a 0° C. environment. The discharge time taken for the battery to be discharged until the closed circuit voltage reached 0.9 V was measured. The discharge time was expressed as an index with that of a battery X1 of Comparative Example 1 taken as 100.

Examples 2 to 5, Comparative Examples 5 and 6

Batteries A2 to A5 of Examples 2 to 5 and batteries X5 and X6 of Comparative Examples 5 and 6 were fabricated and evaluated in the same manner as the battery A1 of Example 1, except that the content of compound A in the negative electrode and the molar ratio of the compound A to the terephthalic acid were set as shown in Table 1.

Comparative Example 1

The battery X1 of Comparative Example 1 was fabricated and evaluated in the same manner as the battery A1 of Example 1, except that neither the compound A nor terephthalic acid was contained in the negative electrode.

Comparative Example 2

Potassium phosphate was contained in the negative electrode, but terephthalic acid was not contained. The potassium phosphate content in the negative electrode was set to 0.1 parts by mass per 100 parts by mass of the negative electrode active material.

A battery X2 of Comparative Example 2 was fabricated and evaluated in the same manner as the battery A1 of Example 1, except the above.

Comparative Example 3

A battery X3 of Comparative Example 3 was fabricated and evaluated in the same manner as the battery A1 of Example 1, except that the compound A was not contained in the negative electrode.

Comparative Example 4

A battery X4 of Comparative Example 4 was fabricated and evaluated in the same manner as the battery A1 of Example 1, except that, in place of the compound A, potassium acetate was contained in the negative electrode, and the potassium acetate content in the negative electrode was set to 0.1 parts by mass per 100 parts by mass of the negative electrode active material.

The evaluation results are shown in Table 1.

acid was below 0.025, the liquid balance between the positive and negative electrodes became unfavorable, and the discharge performance in a low temperature environment deteriorated.

In the battery X6 of Comparative Example 6 in which the molar ratio of the potassium phosphate to the terephthalic acid was above 2.5, due to excess of the potassium phosphate, the liquid balance between the positive and negative electrodes become unfavorable, and the discharge performance in a low temperature environment deteriorated.

Examples 6 to 12

As the compound A, compounds a1 to a7 (ester compound A) as shown in Tables 2 and 3 were used. The content of the compound A in the negative electrode was set to 0.24 parts by mass per 100 parts by mass of the negative electrode active material. The (P/Zn) ratio by mol and the (Compound A/Terephthalic acid) ratio by mol were set as shown in Table 4.

Batteries B1 to B7 of Examples 6 to 12 were fabricated and evaluated in the same manner as the battery A1 of Example 1, except the above. The evaluation results are shown in Table 4.

TABLE 1

| | Battery No. | Compound A<br>Phosphate salt | Content (part by mass) | Molar ratio: (P/Zn) | Molar ratio: (Compound A/Terephthalic acid | Negative electrode active material particle diameter (D50) (μm) | Discharge performance in a low temperature environment (Index) |
|---|---|---|---|---|---|---|---|
| Ex. 2 | A2 | Potassium phosphate | 0.005 | 0.000015 | 0.028 | 130 | 103 |
| Ex. 1 | A1 | Potassium phosphate | 0.05 | 0.00015 | 0.28 | 130 | 105 |
| Ex. 3 | A3 | Potassium phosphate | 0.1 | 0.00031 | 0.56 | 130 | 106 |
| Ex. 4 | A4 | Potassium phosphate | 0.25 | 0.00077 | 1.4 | 130 | 104 |
| Ex. 5 | A5 | Potassium phosphate | 0.45 | 0.0014 | 2.5 | 130 | 103 |
| Com. Ex. 1 | X1 | Not added | 0 | 0 | — | 130 | 100 |
| Com. Ex. 2 | X2 | Potassium phosphate | 0.1 | 0.00031 | — | 130 | 101 |
| Com. Ex. 3 | X3 | Not added | 0 | 0 | 0 | 130 | 102 |
| Com. Ex. 4 | X4 | (Potassium acetate) | (0.1) | 0 | 0 | 130 | 101 |
| Com. Ex. 5 | X5 | Potassium phosphate | 0.0025 | 0.0000077 | 0.014 | 130 | 102 |
| Com. Ex. 6 | X6 | Potassium phosphate | 0.49 | 0.0015 | 2.8 | 130 | 100 |

In the batteries A1 to A5 of Examples 1 to 5 in which terephthalic acid and the compound A were contained in a specific molar ratio in the negative electrode, the discharge performance in a low temperature environment was improved.

In the battery X1 of Comparative Example 1 in which neither terephthalic acid nor the compound A was contained in the negative electrode, the discharge performance in a low temperature environment deteriorated. In the battery X2 of Comparative Example 2 in which terephthalic acid was not contained in the negative electrode, the discharge performance in a low temperature environment deteriorated. In the battery X3 of Comparative Example 3 in which the compound A was not contained in the negative electrode, the discharge performance in a low temperature environment deteriorated. In the battery X4 of Comparative Example 4 in which potassium acetate was contained in place of the potassium phosphate in the negative electrode, the discharge performance in a low temperature environment deteriorated.

In the battery X5 of Comparative Example 5 in which the molar ratio of the potassium phosphate to the terephthalic

TABLE 2

| | Compound represented by general formula (1)<br>$R^1$ | $R^2$ | n1 | $X^1$ | $Y^1$ |
|---|---|---|---|---|---|
| Compound a1 | Ethyl group: $C_2H_5$— | — | 0 | OH | H |
| Compound a5 | Ethyl group: $C_2H_5$— | Ethylene group: —$C_2H_4$— | 2 | OH | H |
| Compound a6 | Nonyl group: $C_9H_{19}$— | Ethylene group: —$C_2H_4$— | 4 | OH | H |
| Compound a7 | Dodecyl group: $C_{12}H_{25}$— | Ethylene group: —$C_2H_4$— | 3 | OH | H |

TABLE 3

| | Compound represented by general formula (2) | | | | | | |
|---|---|---|---|---|---|---|---|
| | $R^3$ | $R^4$ | n2 | $R^5$ | $R^6$ | n3 | $X^2$ |
| Compound a2 | Ethyl group: $C_2H_5$— | | 0 | Ethyl group: —$C_2H_5$ | — | 0 | H |
| Compound a3 | Butyl group: $C_4H_9$— | | 0 | Butyl group: —$C_4H_9$ | — | 0 | OH |
| Compound a4 | Tetradecyl group: $C_{14}H_{29}$— | Ethylene group: —$C_2H_4$— | 1 | Ethyl group: —$C_2H_5$ | Ethylene group: —$C_2H_4$ | 1 | OH |

TABLE 4

| | | Compound A | | | Molar ratio: (Compound | Negative electrode active material | Discharge performance in a low temperature |
|---|---|---|---|---|---|---|---|
| | Battery No. | Compound species | Content (part by mass) | Molar ratio: (P/Zn) | A/Terephthalic acid | particle diameter (D50) (μm) | environment (Index) |
| Ex. 6 | B1 | Compound a1 | 0.24 | 0.0013 | 2.28 | 130 | 107 |
| Ex. 7 | B2 | Compound a2 | 0.24 | 0.0012 | 2.09 | 130 | 106 |
| Ex. 8 | B3 | Compound a3 | 0.24 | 0.00076 | 1.37 | 130 | 106 |
| Ex. 9 | B4 | Compound a4 | 0.24 | 0.00039 | 0.70 | 130 | 108 |
| Ex. 10 | B5 | Compound a5 | 0.24 | 0.00074 | 1.35 | 130 | 109 |
| Ex. 11 | B6 | Compound a6 | 0.24 | 0.00054 | 0.99 | 130 | 109 |
| Ex. 12 | B7 | Compound a7 | 0.24 | 0.00040 | 0.72 | 130 | 108 |

In the batteries B1 to B7 of Examples 6 to 12 in which terephthalic acid and the compounds a1 to a7 were contained in a specific molar ratio in the negative electrode, the discharge performance in a low temperature environment improved. In particular, the batteries B4 to B7 exhibited excellent discharge performance.

Examples 13 to 15

Batteries D1 to D3 of Examples 13 to 15 were fabricated and evaluated, respectively, in the same manner as the batteries A1, B1 and B5 of Examples 1, 6 and 10, except that a zinc alloy powder having a particle diameter (D50) of 65 μm and including particles of 75 μm or less in a proportion of 72 vol % was used as the negative electrode active material. The evaluation results are shown in Table 5.

REFERENCE SIGNS LIST

1 battery case
2 positive electrode
3 negative electrode
4 bottomed cylindrical separator
**4*a*** cylindrically-shaped separator
**4*b*** bottom paper
5 gasket
**5*a*** thin-walled portion
6 negative electrode current collector
7 negative electrode terminal plate
8 outer label
9 sealing unit

TABLE 5

| | | Compound A | | | Molar ratio: (Compound | Negative electrode active material | Discharge performance in a low temperature |
|---|---|---|---|---|---|---|---|
| | Battery No. | Compound species | Content (part by mass) | Molar ratio: (P/Zn) | A/Terephthalic acid | particle diameter (D50) (μm) | environment (Index) |
| Ex. 1 | A1 | Potassium phosphate | 0.05 | 0.00015 | 0.28 | 130 | 105 |
| Ex. 6 | B1 | Compound a1 | 0.24 | 0.0013 | 2.28 | 130 | 107 |
| Ex. 10 | B5 | Compound a5 | 0.24 | 0.00074 | 1.35 | 130 | 109 |
| Ex. 13 | D1 | Potassium phosphate | 0.05 | 0.00015 | 0.28 | 65 | 106 |
| Ex. 14 | D2 | Compound a1 | 0.24 | 0.0013 | 2.28 | 65 | 109 |
| Ex. 15 | D3 | Compound a5 | 0.24 | 0.00074 | 1.35 | 65 | 110 |

In the batteries D1 to D3 of Examples 13 to 15, the discharge performance in a low temperature environment was further improved.

INDUSTRIAL APPLICABILITY

The alkaline dry battery according to the present disclosure can be suitably used as a power source for, for example, portable audio equipment, electronic game players, lights and the like.

The invention claimed is:

1. An alkaline dry battery, comprising: a positive electrode; a negative electrode; a separator disposed between the positive electrode and the negative electrode; and an electrolyte, wherein the negative electrode includes a negative electrode active material containing zinc, a compound A having a P—O bond, and terephthalic acid, the compound A contains at least one selected from the group consisting of phosphoric acid, a phosphate salt, a phosphite ester, and a phosphate ester, a molar ratio: P/Zn of P element derived from the compound A to Zn element derived from the negative electrode active material is 0.00001 or more and 0.0014 or less in the negative electrode, and a molar ratio of the compound A to the terephthalic acid is 0.025 or more and 2.5 or less.

2. The alkaline dry battery according to claim 1, wherein the negative electrode active material is in a form of particles, and a diameter D50 of each of the particles of the negative electrode active material contained in the negative electrode is 40 µm or more and 120 µm or less.

3. The alkaline dry battery according to claim 1, wherein the negative electrode active material is in a form of particles, and a diameter D50 of each of the particles of the negative electrode active material contained in the negative electrode is 40 µm or more and 75 µm or less.

4. The alkaline dry battery according to claim 1, wherein the negative electrode active material is in a form of particles, and the particles of the negative electrode active material contained in the negative electrode includes particles having a diameter of 40-75 µm or less in a proportion of 60 vol % or more.

5. The alkaline dry battery according to claim 1, wherein the compound A includes a compound represented by a general formula (1):

[Chem. 1]

(1)

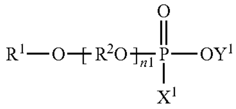

in the general formula (1), $R^1$ is a hydrocarbon group having 1 to 20 carbon atoms, $R^2$ is an ethylene group or a propylene group, n1 represents an average number of moles of added $R^2O$ and is 0 or more and 8 or less, $X^1$ is a hydrogen atom or an $OM^1$ group, $M^1$ is a hydrogen atom or an alkali metal atom, and $Y^1$ is a hydrogen atom or an alkali metal atom.

6. The alkaline dry battery according to claim 5, wherein the n1 in the general formula (1) is 2 or more and 4 or less.

7. The alkaline dry battery according to claim 1, wherein the compound A includes a compound represented by a general formula (2):

[Chem. 2]

(2)

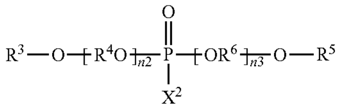

in the general formula (2), $R^3$ and $R^5$ are each independently a hydrocarbon group having 1 to 20 carbon atoms, and $R^4$ and $R^6$ are each independently an ethylene group or a propylene group, n2 represents an average number of moles of added $R^4O$ and is 0 or more and 8 or less, n3 represents an average number of moles of added $OR^6$ and is 0 or more and 8 or less, $X^2$ is a hydrogen atom or an $OM^2$ group, and $M^2$ is a hydrogen atom or an alkali metal atom.

8. The alkaline dry battery according to claim 7, wherein a total of the n2 and the n3 in the general formula (2) is 2 or more and 4 or less.

* * * * *